(12) United States Patent
Chin et al.

(10) Patent No.: US 9,869,562 B2
(45) Date of Patent: Jan. 16, 2018

(54) METHOD AND SYSTEM FOR CONTEXTUALLY RECOMMENDING A PLACE OF INTEREST TO A USER AND SMART CHECK-IN

(71) Applicant: Bayerische Motoren Werke Aktiengesellschaft, Munich (DE)

(72) Inventors: Alvin Chin, Chicago, IL (US); Kasthuri Rengan Nallappa Soundararajan, Schaumburg, IL (US); Clint Woker, St. Charles, IL (US); Jilei Tian, Chicago, IL (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 48 days.

(21) Appl. No.: 15/049,431

(22) Filed: Feb. 22, 2016

(65) Prior Publication Data

US 2017/0241788 A1 Aug. 24, 2017

(51) Int. Cl.
*G01C 21/34* (2006.01)
*G01C 21/36* (2006.01)

(52) U.S. Cl.
CPC ....... *G01C 21/343* (2013.01); *G01C 21/3644* (2013.01); *G01C 21/3679* (2013.01)

(58) Field of Classification Search
CPC ............ G01C 21/343; G01C 21/36644; G01C 21/3679

USPC .......................................... 701/426, 533, 539
See application file for complete search history.

(56) References Cited

U.S. PATENT DOCUMENTS

| | | |
|---|---|---|
| 5,906,654 A | 5/1999 | Sato |
| 2002/0167442 A1 | 11/2002 | Taylor |
| 2006/0041663 A1 | 2/2006 | Brown et al. |
| 2008/0300778 A1 | 12/2008 | Kuznetsov |
| 2009/0018766 A1 | 1/2009 | Chen et al. |
| 2009/0240429 A1* | 9/2009 | Tanaka ............... G01C 21/3682 701/533 |
| 2015/0100240 A1* | 4/2015 | Toopran ............. G01C 21/3608 701/539 |
| 2016/0104232 A1* | 4/2016 | Perks ................. G06Q 30/0631 705/26.62 |

\* cited by examiner

*Primary Examiner* — Tan Q Nguyen
(74) *Attorney, Agent, or Firm* — Crowell & Moring LLP (57) ABSTRACT

The disclosure is directed to improving driving experience. For example, using one or more computing devices, a current location of a user may be determined and a place of interest, located at a distance from the current location, may be identified. The one or more computing devices may determine that the place of interest meets one or more requirements, and designate the place of interest as a candidate place of interest. The candidate place of interest may be recommended to the user based on a defined criteria. The one or more computing devices may also determine that the user has arrived at a parking location corresponding to the candidate place of interest, and associate the parking location and the candidate place of interest based on one or more inputs by the user.

17 Claims, 7 Drawing Sheets

METHOD AND SYSTEM FOR CONTEXTUALLY RECOMMENDING A PLACE OF INTEREST TO A USER AND SMART CHECK-IN

BACKGROUND ART

Prior to driving a vehicle from one geographical location a current location) to another geographical location (e.g., a destination location), a driver may choose to take a specific route, among a plurality of available routes, based on various factors. These factors may include external driving conditions, such as traffic, weather, road conditions, etc. and/or driver-specific conditions, such as time constraints, time of travel, convenience, personal preference, etc.

The driver may open and use a map application (or a trip application) on a computer, for example, to view all of the available routes to the destination location. Subsequently, the driver may select a specific route based on desired criteria, for instance, the route that will allow the driver to arrive at the destination location within a particular period of time. In addition to displaying the plurality of available routes, the map application may also display numerous places near or along the selected route, such as gas stations, restaurants, shopping malls, tourist attractions, etc.

Typically, these places may be displayed to the driver all at once without any regard, connection, or relation to the driver's interests, desired criteria, and/or the trip itself. For example, one of the numerous places that the map application may display could be a restaurant located off an exit along the selected route. The driver may not know, however, that driving to that restaurant may unnecessarily lengthen time of travel, and even worse, eating at that restaurant, due to its slow service, may not allow the driver to arrive at the destination location within a desired period of time.

The driver may also use a location-based application, for instance, to "check-in" to a particular place. For example, the location-based application may be a social media application. However, the location-based application is limited in that it may not allow the driver to specify, comment, or otherwise inform other people about the place other than that the driver has arrived at that particular place at a certain time.

In view of the foregoing, there is a need for personalizing the driving experience while ensuring minimal driver distraction by displaying only the places that are relevant to the driver, and also allowing the driver to report more information about the physical location of a particular place when checking-in.

SUMMARY OF THE INVENTION

According to one example of the present disclosure, a method for recommending a candidate place of interest to a user is provided. The method may include determining, using one or more computing devices, a current location of the user, and identifying a place of interest located at a distance from the current location. The method may also include determining, using the one or more computing devices, that the place of interest meets one or more requirements, and designating the place of interest as the candidate place of interest. The candidate place of interest may be recommended to the user based on a defined criteria. The method may further include determining that a user has arrived at a parking location corresponding to the candidate place of interest, and associating the parking location and the candidate place of interest based on one or more inputs by the user.

According to another example of the present disclosure, a non-transitory computer-readable medium including a set of executable instructions is provided. The set of executable instruction when executed by at least one processor causes the at least one processor to perform a method for recommending a candidate place of interest to a user. The method may include determining, using one or more computing devices, a current location of the user, and identifying a place of interest located at a distance from the current location. The method may also include determining, using the one or more computing devices, that the place of interest meets one or more requirements, and designating the place of interest as the candidate place of interest. The candidate place of interest may be recommended to the user based on a defined criteria.

According to yet another example of the present disclosure, a system for recommending a candidate place of interest to a user is provided. The system may include one or more computing devices executing stored program instructions to: determine a current location of the user, identify a place of interest located at a distance from the current location, determine that the place of interest meets one or more requirements, designate the place of interest as the candidate place of interest, and recommend the candidate place of interest to the user based on a defined criteria.

Other objects, advantages and novel features of the present invention will become apparent from the following detailed description of one or more preferred embodiments when considered in conjunction with the accompanying drawings.

DETAILED DESCRIPTION OF EMBODIMENTS OF THE INVENTION

The present disclosure is directed to improving driving experience. For example, only places that are of interest and relevant to one or more users, e.g., the driver, passenger(s), along a selected route may be determined and recommended based on various types of information associated with the driver, desired criteria, and/or the trip. To minimize distraction and reduce clutter, for instance, the places of interest may be ranked and displayed one at a time during the course of the trip. In a further example, when the driver arrives at a particular place of interest, the driver may be able to share and comment on the physical location of the place of interest, such as parking information, to other people interested in visiting the place.

In one aspect of the disclosure, a place may be determined as a "candidate" place of interest, and may be subsequently recommended to the driver, if one or more requirements are met. For example, a requirement may include the place being located at a certain distance threshold from the driver's current location, the place being associated with the driver's interest (e.g., interest in nature and the outdoors), the place being able to be visited during the trip without impacting the driver's desired arrival time to the destination location, and/or the place being related to a time-associated event, such as breakfast, lunch, dinner, etc.

In another aspect of the disclosure, each place of interest that is selected as a "candidate" may be ranked based on a certain score. For instance, the higher the score, the more likely that the place of interest will be recommended to the driver. By way of example, the score for each candidate may be based on one or more of the following factors: the candidate place of interest which has the shortest distance from the driver's current location, the candidate place of interest which was previously visited by friends of the driver, the candidate place of interest which has the highest user rating on a particular rating website, and/or the candidate place of interest which meets or exceeds a certain threshold (e.g., a threshold set by the user, such as dietary restrictions, a particular user-rating).

In yet another aspect of the disclosure, the driver may be able to "check-in" to a recommended place of interest by being able to record physical location information (such as parking location information), associate that parking location with the place of interest, and/or comment on the place of interest (and/or the parking location itself), for instance, through various social media check-in services. In that regard, for instance, the parking location may be used as the place's actual physical location so that other drivers can accurately navigate to that place of interest without having to spend extra time figuring out how to get to the parking location. Accordingly, when this place of interest is recommended to another driver, the check-in information uploaded by the driver that has already checked-in may be presented to the other driver so as to give the other driver a preview, for instance, of how easy or difficult getting to the parking location may be, or otherwise more information about the place of interest.

The present disclosure may be implemented on one or more computing devices. For example, a driver may use a mobile computer, such as a smartphone, to launch and run an application that contextually recommends a candidate place of interest and allows the user to check-in to the candidate place of interest. In another example, an in-vehicle computer of a particular vehicle may launch and run the application. In a further example, the application may run on both the smartphone and in-vehicle computer, simultaneously. Moreover, the candidate places of interest may be outputted via a display, such as a smartphone display, a head-up display, etc.

Figure 1:
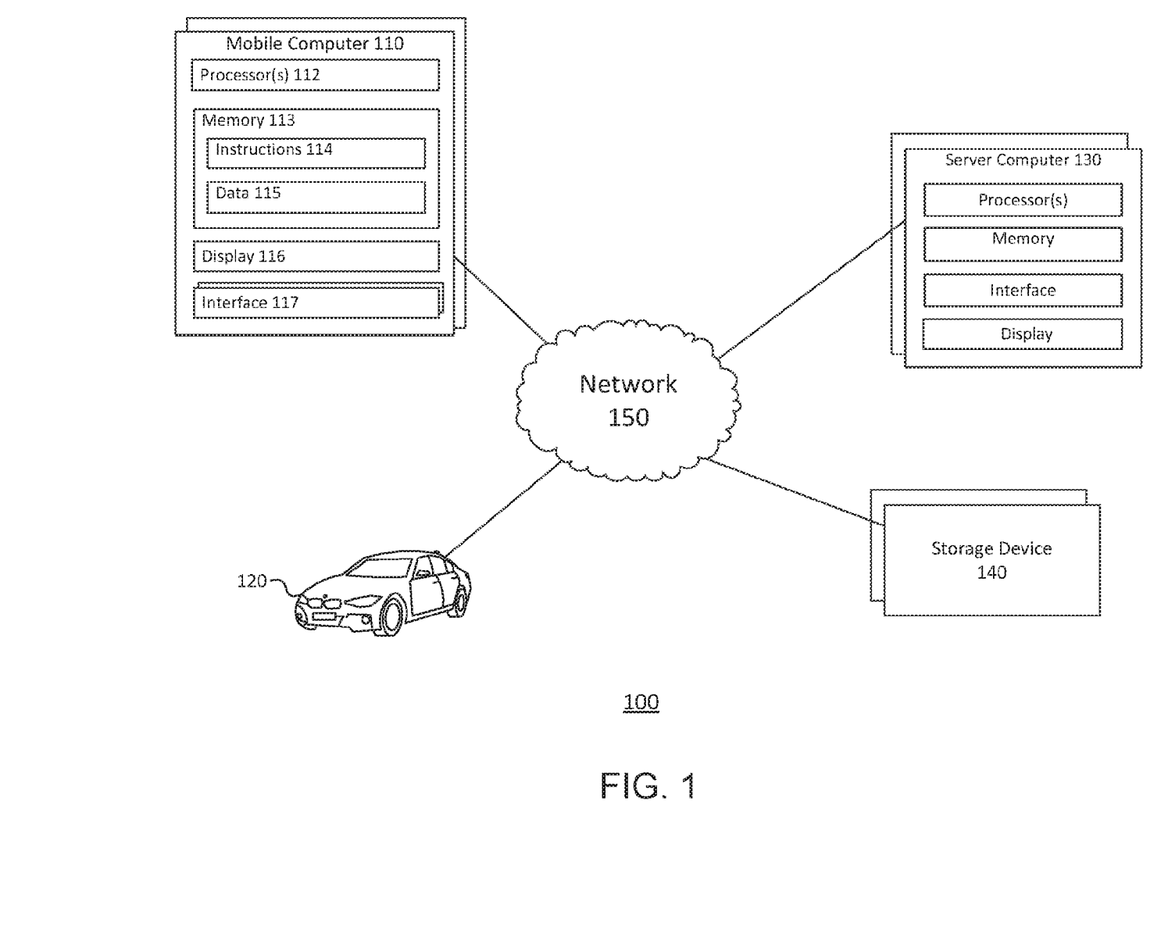
FIG. 1 illustrates a system in accordance with one or more aspects of the disclosure.

FIG. 1 illustrates an example of a system 100 in accordance with one or more aspects of the disclosure. As described above, a user (e.g., driver, passenger, etc.) may download an application for contextual recommendation of places of interest and smart check-in onto mobile computer 110 via network 150. For instance, the mobile computer 110 may download the application from server computer 130 or storage device 140 of network 150. Similarly, the user may download the application onto an in-vehicle computer (not shown) of vehicle 120 via network 150. In some examples, the in-vehicle computer and the mobile computer 110 may be communicatively coupled to each other using a wired or wireless connection (e.g., Bluetooth). In that regard, the application may automatically initiate on the in-vehicle computer when the user starts the application on the mobile computer 110, or vice versa.

The mobile computer 110 may be any type of mobile device with computing capability and/or connectivity to a network, such as a laptop, Ultrabook, smartphone, PDA, tablet computer, etc. The mobile computer 110 may include at least one or more processors 112, memory 113, display 116, and interface 117. The processor 112 may instruct the components of mobile computer 110 to perform various tasks based on the processing of information and/or data that may have been previously stored or have been received, such as instructions 114 and/or data 115 stored in memory 113. The processor 112 may be a standard processor, such as a central processing unit (CPU), or may be a dedicated processor, such as an application-specific integrated circuit (ASIC) or a field programmable gate array (FPGA).

Memory 113 stores information and/or data that can be accessed by processor 112, including instructions 114 executable by the processor 112 and data 115 (which can be retrieved, manipulated and/or stored by the processor 112 in accordance with the set of instructions 114 or other sets of executable instructions).

The instructions 114 may be software that can be implemented on the mobile computer 110. It should be noted that the terms "instructions," "steps," "algorithm," and "programs" may be used interchangeably. For example (and as will be further discussed below), the instructions 114 may include one or more algorithms, steps, and/or processes to determine and recommend candidate place(s) of interest to a driver, rank each candidate place of interest by assigning it a score and/or value, and allowing a user to check-in to a place of interest.

The data 115 may include various types of information, such as map information, traffic information, weather conditions, distances between geographical locations, speed limits, information related to a user's (driver, passenger, etc.) previous trips, the driver's favorite locations, the driver's preferences, the driver's favorite type of food, the driver's hobbies, data retrieved from social media profiles, parking and check-in information, etc. As a further example, the data 115 may be inputted by the driver, such as a selection of a particular route between two geographical locations, desired arrival time, learned or driver-defined thresholds, such as restaurants with three out of five stars, or above, etc. The data 115 may be transmitted to the in-vehicle computer of vehicle 120, server computer 130, and/or storage device 140 which may also store the data 115.

The display 116 may be any type of device capable of outputting and/or communicating data to a user, such as a liquid-crystal display ("LCD") screen, a plasma screen, etc. Interface 117 may be a device, port, or a connection that allows a user to communicate with the mobile computer 110, including but not limited to a touch-sensitive screen, microphone, camera, and may also include one or more input/output ports, such as a universal serial bus (USB) drive, various card readers, etc.

Vehicle 120 may be any vehicle capable of moving one or more individuals from one geographical location to another geographical location. While FIG. 1 illustrates a sedan, it is understood that the vehicle 120 is not limited thereto and may be any type of vehicle, such as a sport utility vehicle, a pickup truck, a coupe, a minivan, a wagon, a hatchback, a bus, a commercial truck, a self-driving car, etc. Moreover, it is understood that any reference to a "driver" in the present disclosure may also include one or more passengers.

The vehicle 120 may include an in-vehicle computer with components (including a head-up display similar to mobile computer 110, as described above, and may be communicatively coupled either directly or indirectly to the mobile computer 110 (or other connected devices on network 150). The in-vehicle computer may be, for instance, physically located within a housing of the vehicle 120, such as the dashboard or the like.

The server computer 130 may include components similar to the mobile computer 110 and in-vehicle computer of vehicle 120. The server computer 130 (and additional server computers) may be rack mounted on a network equipment rack and/or located, for instance, in a data center. In one example, the server computer 130 may use the network 150 to serve the requests of programs executed on mobile computer 110 and/or in-vehicle computer of vehicle 120. The storage device 140 illustrated in FIG. 1 may be configured to store a large quantities of instructions, data, and/or information similar to instructions 114 and data 115.

The system and operations described herein, and illustrated in FIG. 1, will now be described below. The operations are not required to be performed in a particular or precise order. Rather, it is understood that the operations may be performed in a different order, different combinations, or simultaneously, etc.

Figure 2:
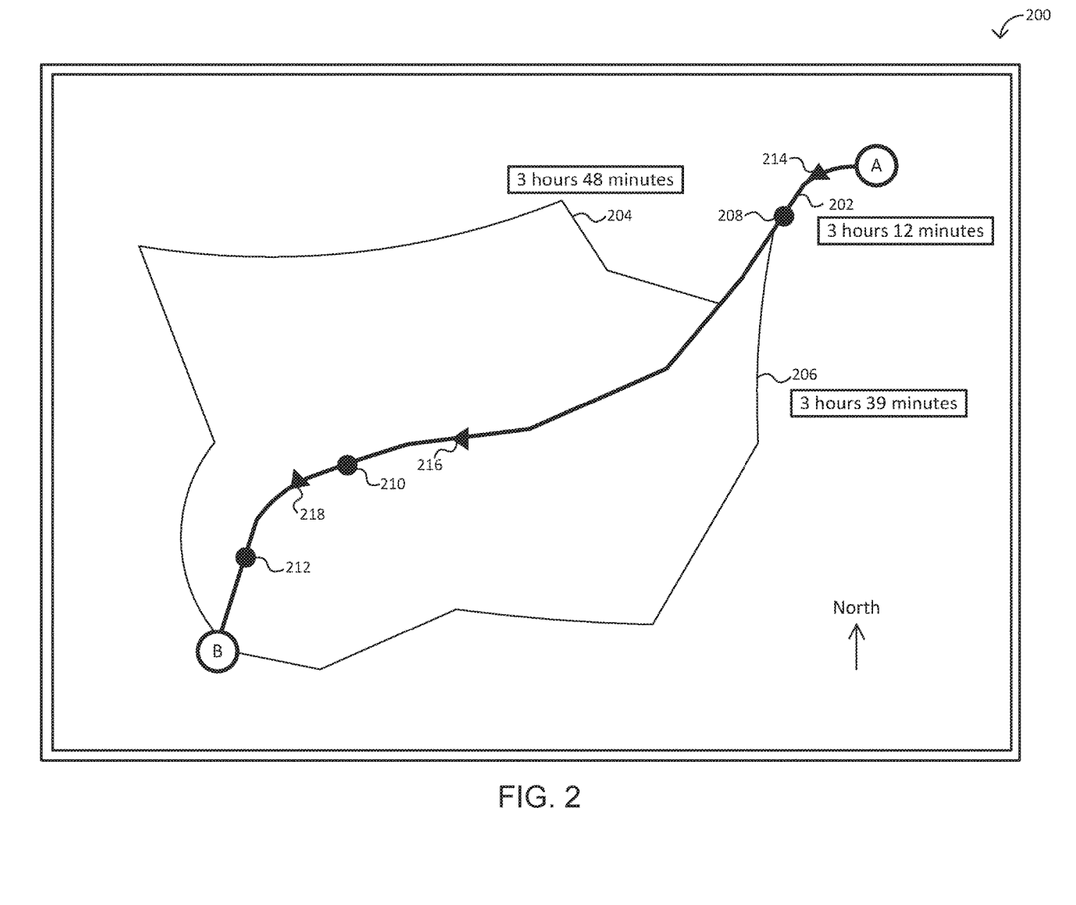
FIG. 2 illustrates a map in accordance with one or more aspects of the disclosure.

By way of example, a driver may decide to take a road trip in a vehicle, such as vehicle 120, from one geographical location to another geographical location. FIG. 2 illustrates a map 200 of the trip from current location "A" to destination location "B." The current location A may be, for instance, the driver's home and destination location B may be the nearest major city. The map 200 may be generated by an application on one or more computing devices, such as mobile computer 110 (e.g., the driver's smartphone) and/or the in-vehicle computer of vehicle 120 illustrated in FIG. 1. As shown, there may be three available driving routes between locations A and B: route 202, route 204, and route 206. A majority of the roads on route 202 may include major highways, whereas routes 204 and 206 may include numerous local roads.

As shown, map 200 indicates that the estimated time of travel on route 202 is approximately three hours and twelve minutes and that route 202 is the most direct route to destination location B. Map 200 also indicates that the estimated time of travel on route 204 is approximately three hours and forty eight minutes, and the estimated time of travel on route 206 is approximately three hours and thirty nine minutes. The driver may want to arrive at destination location B within a specific period of time, e.g., six hours, which may have been inputted to the application by the driver at approximately the same time the destination location was inputted. Given the time constraint and based on the presented information, the driver may select the fastest route to destination location B, e.g., route 202.

During the trip, the mobile computer 110 and/or the in-vehicle computer of vehicle 120 may recommend at least three places of interest to the driver along route 202 during the course of the trip: gas station 208, a pizza restaurant 210, and nature preserve 212, which are represented graphically by the three solid circular dots in FIG. 2. Similarly, three solid triangles represent graphically each instance that a recommendation along route 202 is presented to the driver. For example, triangle 214 represents the instance when gas station 208 is recommended to the driver, triangle 216 represents the instance when the pizza restaurant 210 is recommended, and triangle 218 represents the instance when the nature preserve 212 is recommended. As can be seen, the recommendations are presented to the driver at certain distances prior to arriving at the corresponding place of interest. In one aspect, the distances may be calculated or predetermined so as to give the driver sufficient time to decide whether the driver desires to visit or not visit the respective places of interest.

In one aspect, the three circular dots representing the gas station 208, pizza restaurant 210, nature preserve 212, and/or the three solid triangles 214, 216, and 218 representing the timing of the recommendations may be previewed by the driver prior to the trip. In a further aspect, the places of interest may be recommended, one by one, as the driver approaches the respective places of interest without the driver knowing prior to the trip which places of interest would be recommended.

Figure 3A:
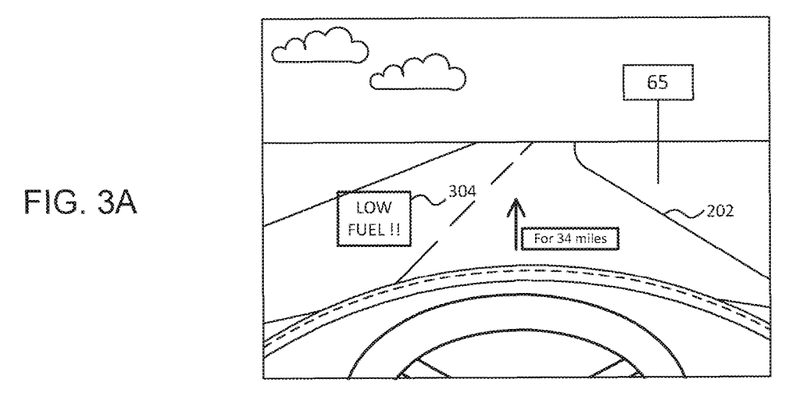
FIGS. 3A to 3C illustrate a recommendation scenario in accordance with one or more aspects of the disclosure.
Figure 3B:
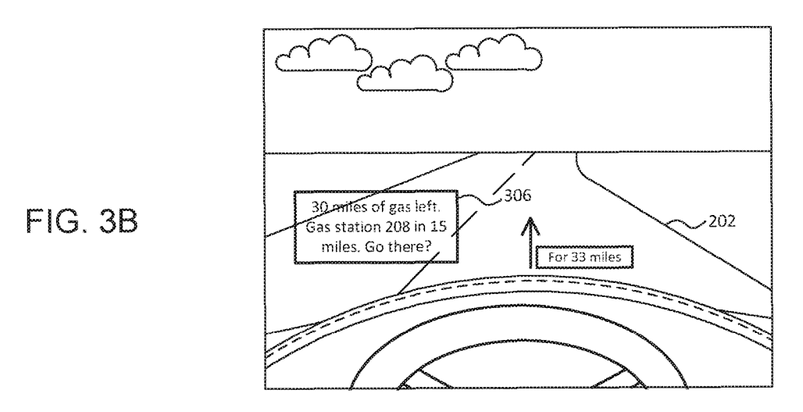
Figure 3C:
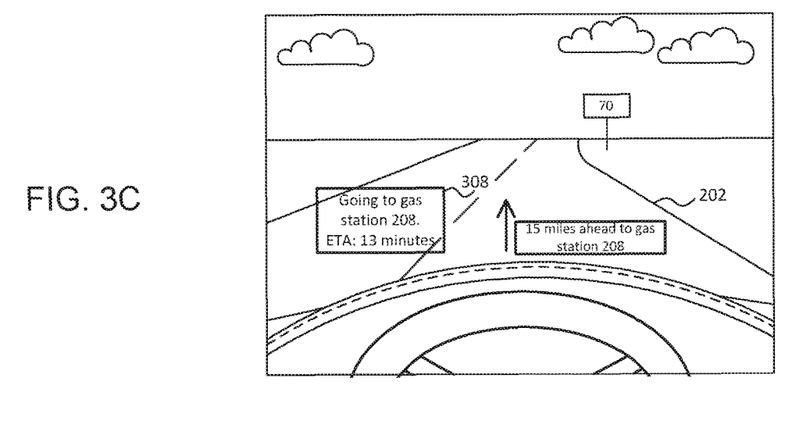

FIGS. 3A-3C illustrate an example recommendation scenario in accordance with one or more aspects of the disclosure. By way of the example described above with respect to FIG. 2, the driver may get into vehicle 120 and depart from current location A toward destination location B via route 202. Information related to the trip may be displayed on the head-up display of vehicle 120. In that regard, FIGS. 3A-3B illustrate what the driver would see from his or her perspective while driving in the vehicle 120.

As can be seen in FIG. 3A, the driver is driving on route 202 in an approximately straight direction and a navigation application displays an arrow instructing the driver to continue driving in the straight direction for 34 miles. While driving, a "low fuel" indication 304 may be displayed to the user (and/or may be spoken to the user such that any driver distraction can be minimized). At this point, the in-vehicle computer of vehicle 120 may determine the amount of gas remaining in the gas tank using one or more sensors and calculate the number of miles associated with the remaining amount of gas, which may be 30 miles in this example. As will be further discussed below, the in-vehicle computer (and/or the mobile computer 110 which may be communicatively coupled to the in-vehicle computer) may be configured to determine a plurality of candidate gas stations near the driver's current location as well as candidate gas stations further along the route 202 based on one or more requirements.

For instance, one of the requirements is that the drive to the candidate gas station can be no more than 30 miles from the current location. Otherwise, the driver may run out of gas on route. Another requirement may be that the time spent getting to and filling up at the candidate gas station will allow the driver to arrive at the destination location within the driver-specified time period, which is six hours. Based on this requirement, for example, the driver may end up going to a gas station located further down route 202 (as opposed to a closer gas station off route 202 that may not allow the driver, for various reasons, to arrive at the destination location in time). Upon the determination of the candidate gas stations, they may be ranked based on respective scores, and the highest ranked gas station may be presented to the driver. Gas station 208, for example, may have received the highest score based on various factors, such as its close proximity to the driver's current location and the driver's preference for the type of gas (e.g., diesel) offered at gas station 208.

FIG. 3B illustrates a recommendation notification 306, which informs the driver that there is approximately 30 miles of gas remaining and inquires whether the driver wants to go to gas station 208 located 15 miles down route 202. The driver may respond to the inquiry in various ways, such as saying "yes" or pressing a specific button located on the steering wheel of vehicle 120. The location of vehicle 120 on route 202 when recommendation 306 is displayed to the driver corresponds to triangle as shown in FIG. 2 and described above. While FIG. 3B shows the recommendation notification 306 being displayed on the windshield of vehicle 120, it can be understood that the notification may also be displayed on a vehicle head unit, which may be adjacent to the dashboard.

FIG. 3C illustrates a confirmation notification 308, which indicates that the driver has selected to go to gas station 208 and that the estimated time of arrival ("ETA") to gas station 208 is approximately 13 minutes. Although FIG. 3C depicts the confirmation notification 308 being displayed on the windshield of vehicle 120, it is understood that the notification may be displayed on the vehicle head unit.

Figure 4A:
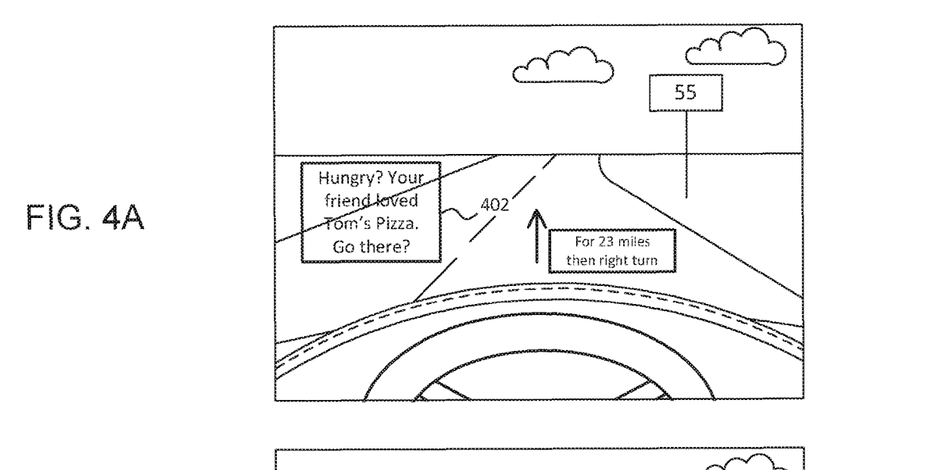
FIGS. 4A to 4C illustrate another recommendation scenario in accordance with one or more aspects of the disclosure.
Figure 4B:
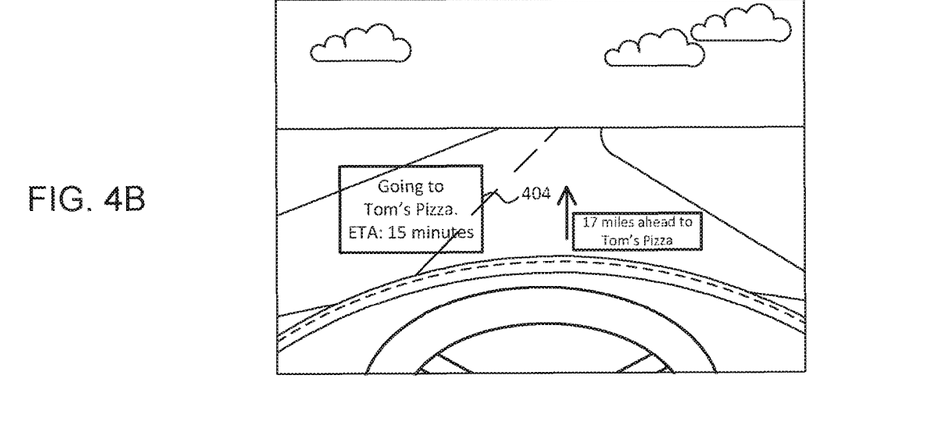
Figure 4C:
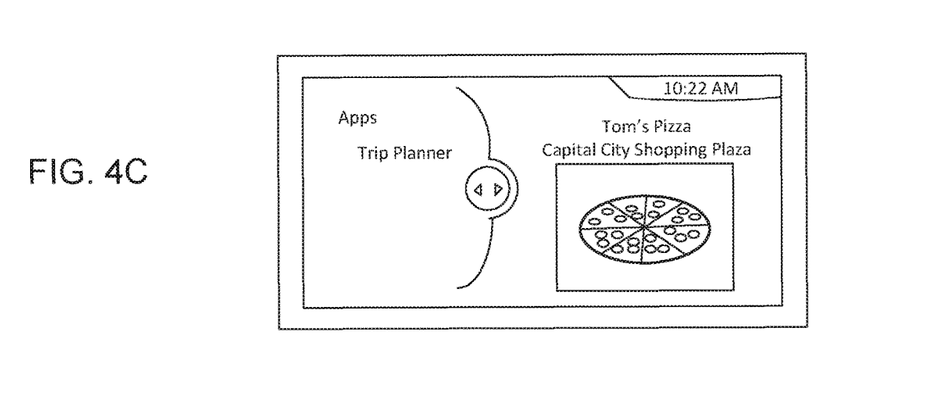

FIGS. 4A-4C illustrate another example recommendation scenario further along the route in accordance with one or more aspects of the disclosure. By way of example only, a particular place of interest may be recommended to the driver if it matches the driver's interests, fits within a certain time context, and/or if driving to and visiting the place of interest does not exceed time constraints set by the driver, e.g., arriving at the destination location within six hours.

In FIG. 4A, the mobile computer 110 and/or in-vehicle computer may determine that it is approximately lunch time and display a recommendation notification 402. The notification inquires whether the driver is hungry and suggests a restaurant called "Tom's Pizza" located at Capital City Shopping Center 17 miles down route 202. The recommendation notification 402 further indicates that one of the driver's friends ate and "loved" Tom's Pizza. In the example of FIG. 4A, Tom's Pizza was recommended because it was a place of interest that met all the requirements to be a candidate (e.g., within distance threshold from current location, matches driver's interest, going to and eating there will still allow the driver to arrive at the destination location within six hours, approximately lunchtime) and was also ranked the highest based on its close proximity to the current location and the fact that a friend tried and loved the food.

FIG. 4B illustrates a confirmation notification 404 indicating that the driver is now going to Tom's Pizza and will take approximately 15 minutes to get there. Moreover, a new set of directions, as shown by the arrow and corresponding description, are provided to the driver. While FIG. 4B illustrates the result of the driver having selected the recommended place of interest, Tom's Pizza, the driver may conversely choose to decline the recommendation. When the driver declines a particular recommendation, a new place of interest (which is also relevant to the driver) may be recommended. This procedure may be repeated until the driver selects a place of interest to visit.

As shown in FIG. 4C, the driver may be able to preview various types of information about Tom's Pizza on the head unit of the vehicle 120 prior to arriving, such as pictures of the food, lunch menu, parking information uploaded by other drivers (which will be further discussed below), reviews of the food, etc.

Figure 5:
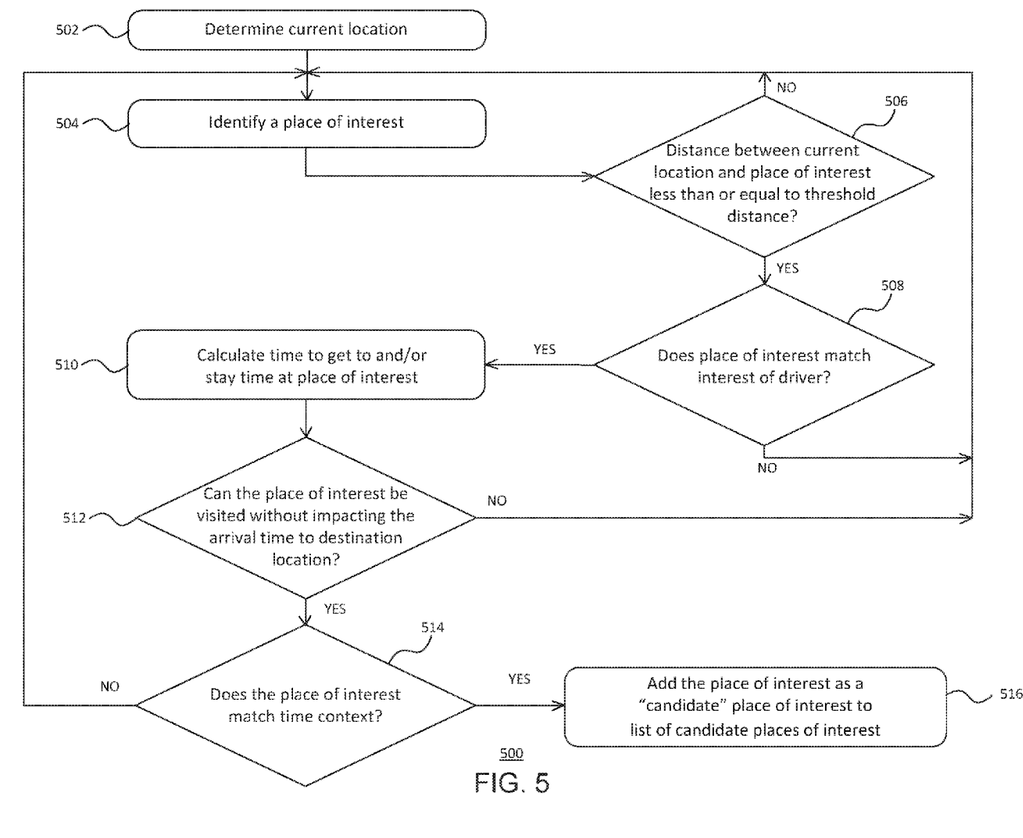
FIG. 5 illustrates a flow chart in accordance with one or more aspects of the disclosure.

FIG. 5 illustrates an example flow chart 500 of determining a candidate place of interest in accordance with one or more aspects of the disclosure. Candidate places of interest that could be recommended to the driver may be determined, for instance, based on various requirements. By way of example, the flow chart illustrated in FIG. 5 may be an algorithm that one or more computing devices (e.g., the mobile computer 110, in-vehicle computer of vehicle 120) may implement to determine a set of candidate places of interest.

At blocks 502 and 504, the current location of the driver is determined and a place of interest (which eventually may be a candidate place of interest) is identified, respectively. At determination block 506, the one or more computing devices may determine whether the distance between the current location and the place of interest is less than or equal to a certain threshold distance. For example, the threshold distance may be the entire distance remaining on the trip (e.g., to include as many places of interest as possible before arriving at the destination location). In another example, the threshold distance may be predefined or preset by the driver. If the place of interest identified at block 504 is less than or equal to the threshold distance, a further determination is made of whether the place of interest matches the interest(s) of the driver at determination block 508. If the distance between the current location and place of interest is greater than the threshold distance, a new place of interest is identified, or selected for candidacy determination, back at block 504.

Information related to the driver's interest(s) may be accessed and/or queried from various sources, such as social media profile, driver-inputted data, history of previously visited places of interest, etc. For instance, it may be known that the driver in the above-example of FIGS. 4A-4C likes pizza and Italian food, which matches the type of food served at Tom's Pizza. If the place of interest matches the driver's interests, the time to get to and/or stay at the place of interest may be calculated or acquired at block 510. Otherwise, the one or more computing devices are configured to identify the next place of interest to analyze.

For example, information for estimating time of arrival, or time to get to the place of interest, may be derived from navigation information or Global Positioning System (GPS) information. Information and estimations related to stay time at the place of interest, for instance, may be acquired from various sources, such as smart check-in information from other drivers (which will be further discussed below), social media, stay time typically associated with the place of interest or time context (e.g., 40 minutes to eat lunch), the driver's past tendencies (e.g., the driver typically takes 40 minutes to eat lunch), etc.

At determination block 512, the one or more computing devices determine whether the place of interest can be visited without impacting the arrival time to the destination location based on the time to get to and stay at the place of interest calculated at block 510. Referring back to the example of FIG. 2, the desired arrival time to destination location B is no more than six hours from time of departure. If the driver cannot arrive at destination location B within six hours after visiting the place of interest, then that place of interest cannot be considered a "candidate," and thus, the next place of interest is selected at block 504 to be analyzed.

If the answer to the determination block 512 is yes, another determination is made at determination block 514: does the place of interest match a certain time context? Time context, for instance, may include the time of day (e.g., approximately breakfast time, approximately lunch time, approximately dinner time), tendencies either inputted by the driver or leaned by the one or more computing devices (e.g., the driver likes to take a break around 3 P.M., the driver likes to eat an early dinner around 4:40 P.M.), etc. If the place of interest does not meet or fit within the time context, the next place of interest is again selected at block 504 to be further analyzed. If the place of interest satisfies the time context requirement, then the place of interest is added as a "candidate" to a set (or list) of candidate places of interest for further processing.

While the flow chart illustrated in FIG. 5 was described with respect to the mobile computer 110 and/or in-vehicle computer of vehicle 120 of system 100, it can be understood that other components of the network 150, such as server computer 130, etc. may perform, compute, and/or process the blocks/acts shown in FIG. 5. Moreover, it is to be understood that while the system 100 and corresponding network 150 were used to describe the above-examples of the disclosure, more than one network may be used to implement the features, aspects, and examples of the present disclosure.

Figure 6:
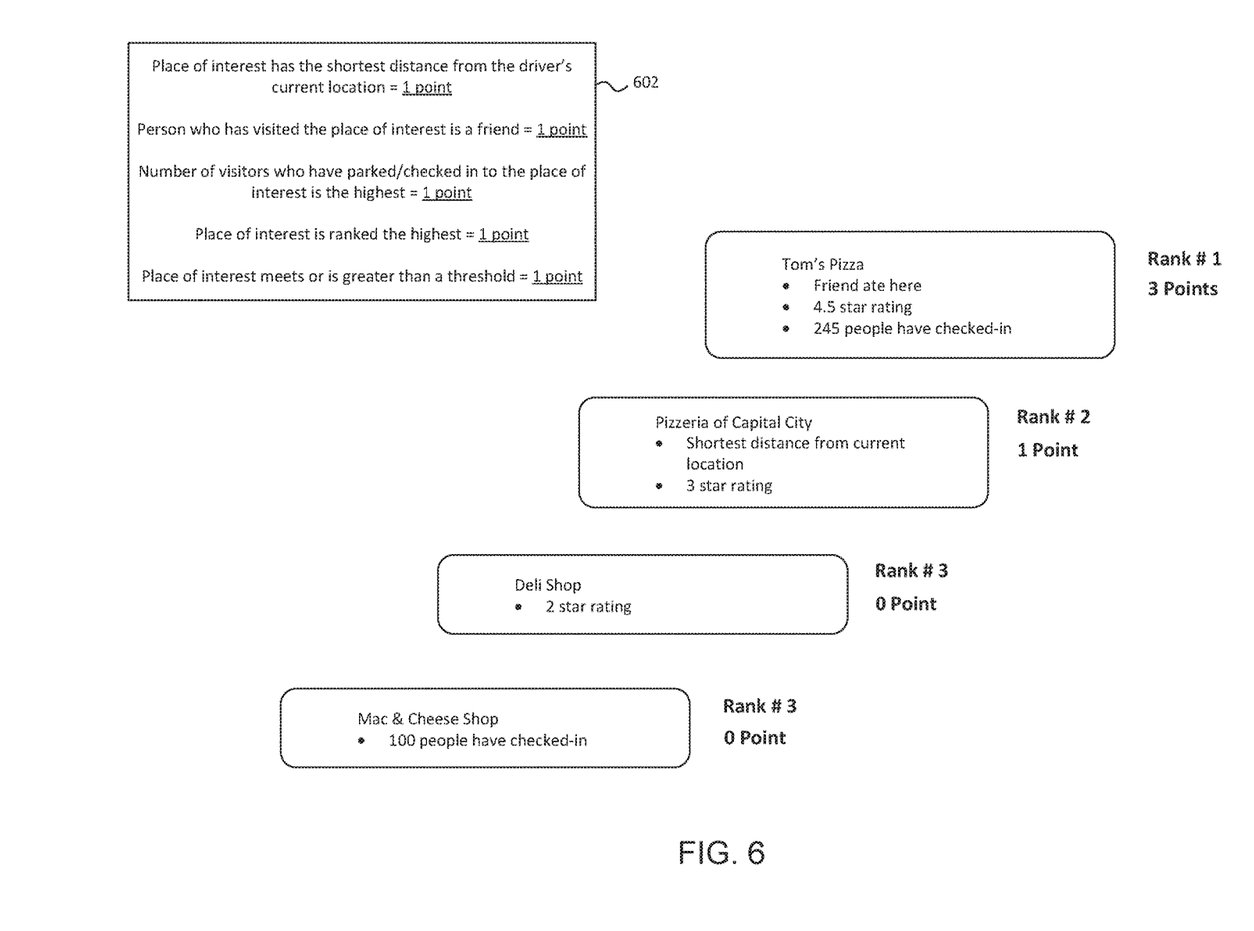
FIG. 6 illustrates a ranking of candidate places of interest in accordance with one or more aspects of the disclosure.

FIG. 6 illustrates an example ranking procedure of the candidate places of interest in accordance with one or more aspects of the disclosure. By way of the examples illustrated in FIGS. 4A-4C and FIG. 5, a set of candidate places of interest may include Tom's Pizza, Pizzeria of Capital City, Deli Shop, and the Mac & Cheese Shop, all of which satisfy the requirements to be considered a "candidate" place of interest. From this list, only one candidate place of interest may be recommended and displayed to the driver based on, for instance, a scoring system illustrated in FIG. 6.

Scoring criteria 602 illustrates the point allocations for different types of descriptions related to the candidate places of interest. As shown, a candidate that has the shortest distance from the driver's current location receives one point. If a friend of the driver has visited the candidate place of interest, then the candidate receives one point. Similarly, the candidate with the highest number of visitors receives one point. The candidate that is ranked the highest by visitors (e.g., via social media, rating websites/applications) receives one point. Lastly, the candidate that meets or is greater than a certain threshold receives one point. The threshold may be set by the driver, for example, places of interest that receive a rating of 3.5 out of 5 stars, or above. While scoring criteria 602 includes five different descriptions and respective point allocations, it can be understood that there may be more descriptions and varying point allocations, e.g., some descriptions may be allocated more points.

In FIG. 6, Tom's Pizza received the highest score of 3 points and is ranked first for satisfying three of the five descriptions in scoring criteria 602. The Pizzeria of Capital City received only 1 point and is ranked second, while the Deli Shop and the Mac & Cheese Shop are both ranked third, respectively, for receiving zero points. In that regard, Tom's Pizza is suggested, recommended, and displayed to the driver, as illustrated in FIGS. 4B-C.

FIGS. 7A-7D illustrate an example check-in scenario in accordance with one or more aspects of the disclosure. Upon recommendation (or the driver's own initiative), the driver may "check-in" to a place of interest and share parking information and other useful comments associated with that place of interest, which may be used for recommending the place of interest to other drivers. By way of the example illustrated in at least FIG. 2, upon recommendation, the driver may decide to visit nature preserve 212.

Figure 7A:
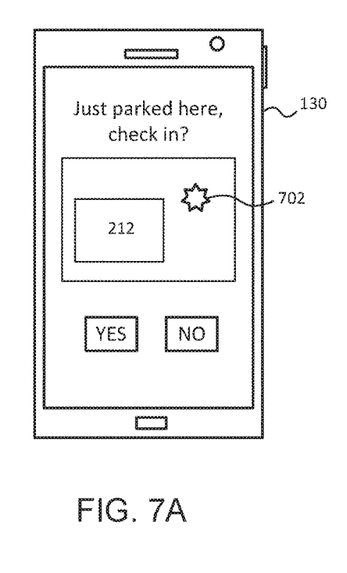
FIGS. 7A to 7D illustrate a check-in scenario in accordance with one or more aspects of the disclosure.
Figure 7B:
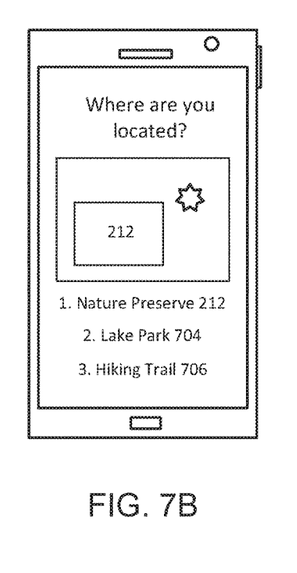

FIG. 7A illustrates the first prompt to the driver when the driver parks vehicle 120 at parking location 702 on nature preserve 212. A computing device, such as mobile computer 110 (which may be a smartphone, as shown), indicates that the driver has parked and inquires whether the driver would like to "check-in." By pressing the "YES" button, the driver checks-in to the place of interest and arrival time is recorded. In some instances, if the computing device cannot specifically pinpoint the location associated with the place of interest, it may prompt the user to select the correct place from a list of places. As illustrated in FIG. 7B, the list of places may include nature preserve 212, lake park 704 (which may be a nearby park), and hiking trail 706 (which may be a nearby hiking trail). The driver may select nature preserve 212.

Figure 7C:
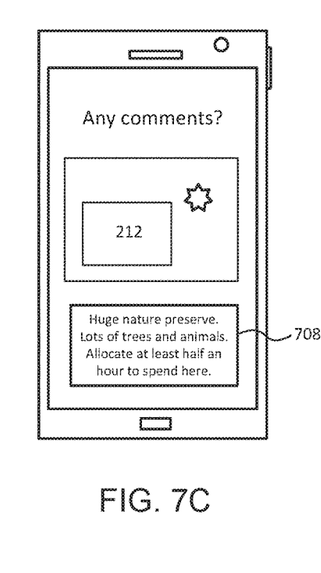
Figure 7D:
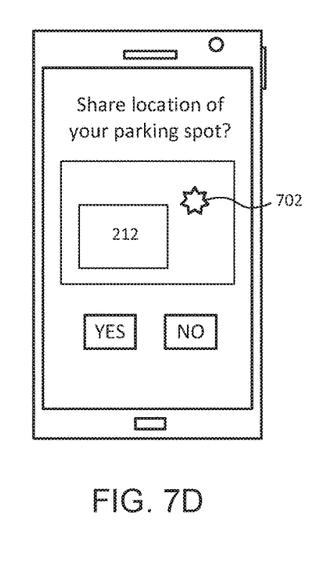

FIG. 7C illustrates the third prompt, which allows the driver to comment on the place of interest and upload associated photographs and/or video. For instance, the driver may comment in comment box 708 that the nature preserve 212 is huge with lots of trees and animals. The driver may further comment that visitors will need to allocate at least 30 minutes to spend time at nature preserve 212. In addition to the driver-specified estimated stay time at the place of interest, the stay time may be calculated based on the driver's arrival and departure times to and from the parking location 702. In FIG. 7D, the fourth prompt on the mobile computer 110 allows the driver to associate the place of interest with the driver's parking location 702 and asks whether the driver would like to share this location with others. The driver has the option to select "YES" or "NO," as shown. In that regard, the example check-in scenario of FIGS. 7A-7D facilitates the sharing of numerous parking locations at the place of interest so that actually arriving there and parking may be made more convenient for other drivers.

Various information and data may be cross-associated between the parking location 702 and the place of interest and generated, such as parking location (longitude and latitude), the name of the place of interest (nature preserve 212), the name or identification of the driver parked at the place of interest (this may be optional), and duration of parking (arrival time minus departure time). Accordingly, numerous types of information and data may be shared with other drivers, such as the above-recited information, the nearest road/route to the place of interest, the type/category of place of interest (e.g., outdoors), the address of the place of interest, average stay time, and user-rankings of the place of interest. It is to be understood that the aforementioned information and data may be stored in different components and/or devices connected to network 150 of FIG. 1, for example.

Numerous advantageous of the present disclosure, include but are not limited to, the efficient use and analysis of data associated with various places of interest to create a personalized driving experience (which may be different for each user). For example, only places of interest relevant to a user may be recommended based on various types of information and data in a manner that is personal to the user. Moreover, all the places of interest that the driver may visit during the trip may be shared with other drivers. In that regard, the driving experience can be a social experience and enhance social interaction. In a further example, the invention of the present disclosure may dynamically evaluate driver-defined time constraints and estimate times of arrival so as to arrive at a destination location within a specific period of time. When the driver decides to visit a certain place of interest, the invention may dynamically re-evaluate the estimated times of arrival. As such, a driving experience personalized for each driver may be realized without impacting driving schedule. In yet a further example, the smart check-in and parking feature of the disclosure allows a social check-in and a physical location check-in, so that parking information at the place of interest can be shared with other drivers. This allows, for instance, a smoother and more convenient visiting experience when arriving at the place of interest.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. Although the disclosure use terminology and acronyms that may not be familiar to the layperson, those skilled in the art will be familiar with the terminology and acronyms used herein.

The invention claimed is:

1. A method for recommending a candidate place of interest to a user, the method comprising the acts of:
   receiving, using one or more computing devices, a destination location;
   receiving, using the one or more computing devices, a time criteria defined by the user, wherein the time criteria includes one or more of the following: (i) a specific time associated with the user having to arrive at the destination location and (ii) a period of time associated with the user having to arrive at the destination location;
   determining, using the one or more computing devices, a current location of the user;
   identifying, using the one or more computing devices, a place of interest located at a distance from the current location;
   determining, using the one or more computing devices, that the place of interest meets one or more requirements, wherein the one or more requirements includes the user being able to visit the place of interest without exceeding the specific time or the period of time associated with the user having to arrive at the destination location of the time criteria based at least in part on a time period of travel to the place of interest and a time period of stay of the user at the place of interest;
   designating, using the one or more computing devices, the place of interest as the candidate place of interest; and
   recommending, using the one or more computing devices, the candidate place of interest to the user based on a defined criteria.

2. The method of claim 1, wherein the one or more requirements includes a distance between the place of interest and the current location being equal to or less than a threshold distance.

3. The method of claim 2, wherein the threshold distance is a remaining distance between the current location and the destination location.

4. The method of claim 1, wherein the one or more requirements includes the place of interest matching with at least one interest associated with the user.

5. The method of claim 4, wherein the at least one interest associated with the user includes one or more of a hobby, a type of food, a type of activity, an interest, and a preference.

6. The method of claim 1, wherein the one or more requirements includes the place of interest matching a time context.

7. The method of claim 6, wherein the time context is associated with a time of day.

8. The method of claim 1, wherein the one or more computing devices includes one or more of an in-vehicle computer, a mobile computer, and a server computer.

9. The method of claim 1, wherein the place of interest is located along a route between the current location and the destination location.

10. The method of claim 1, wherein the act of recommending the candidate place of interest to the user based on the defined criteria comprises outputting, using the one or more computing devices, the candidate place of interest to the user via a display.

11. The method of claim 10, wherein the display includes a head-up display.

12. The method of claim 1, wherein the act of recommending the candidate place of interest to the user based on the defined criteria comprises:
   assigning, using the one or more computing devices, a score to each designated candidate place of interest;
   determining, using the one or more computing devices, which score is highest; and
   selecting, using the one or more computing devices, the candidate place of interest having the highest score for recommendation.

13. The method of claim 12, wherein the score is based on at least one of the following: distance from the current location, whether a person who has visited is an acquaintance, number of people who have visited, associated ranking, and whether a threshold defined by the user is met.

14. The method of claim 1, further comprising the acts of:
   determining, using the one or more computing devices, that the user has arrived at a parking location corresponding to the candidate place of interest; and
   associating, using the one or more computing devices, the parking location and the candidate place of interest based on one or more inputs by the user.

15. The method of claim 14, further comprising the act of receiving, using the one or more computing devices, at least one comment from the user about one or more of the parking location and candidate place of interest.

16. A non-transitory computer-readable medium comprising a set of executable instructions, the set of executable instructions when executed by at least one processor causes the at least one processor to perform a method for recommending a candidate place of interest to a user, the method comprising the acts of:
   receiving a destination location;
   receiving a time criteria defined by the user, wherein the time criteria includes one or more of the following: (i) a specific time associated with the user having to arrive at the destination location and (ii) a period of time associated with the user having to arrive at the destination location;
   determining a current location of the user;
   identifying a place of interest located at a distance from the current location;
   determining that the place of interest meets one or more requirements, wherein the one or more requirements includes the user being able to visit the place of interest without exceeding the specific time or the period of time associated with the user having to arrive at the destination location of the time criteria based at least in part on a time period of travel to the place of interest and a time period of stay of the user at the place of interest;
   designating the place of interest as the candidate place of interest; and
   recommending the candidate place of interest to the user based on a defined criteria.

17. A system for recommending a candidate place of interest to a user, the system comprising:
one or more computing devices executing stored program instructions to:
receive a destination location;
receive a time criteria defined by the user, wherein the time criteria includes one or more of the following: (i) a specific time associated with the user having to arrive at the destination location and (ii) a period of time associated with the user having to arrive at the destination location;
determine a current location of the user;
identify a place of interest located at a distance from the current location;
determine that the place of interest meets one or more requirements, wherein the one or more requirements includes the user being able to visit the place of interest without exceeding the specific time or the period of time associated with the user having to arrive at the destination location of the time criteria based at least in part on a time period of travel to the place of interest and a time period of stay of the user at the place of interest;
designate the place of interest as the candidate place of interest; and
recommend the candidate place of interest to the user based on a defined criteria.

* * * * *